US008708590B2

(12) United States Patent
Johnson et al.

(10) Patent No.: US 8,708,590 B2
(45) Date of Patent: Apr. 29, 2014

(54) SYSTEM AND METHOD FOR PRINTING AND CUTTING

(75) Inventors: Jonathan A. Johnson, Orem, UT (US); Matthew B. Strong, Pleasant Grove, UT (US); Phil Beffrey, Petaluma, CA (US)

(73) Assignee: Provo Craft and Novelty, Inc., South Jordan, UT (US)

( * ) Notice: Subject to any disclaimer, the term of this patent is extended or adjusted under 35 U.S.C. 154(b) by 0 days.

(21) Appl. No.: 13/412,358

(22) Filed: Mar. 5, 2012

(65) Prior Publication Data

US 2012/0160067 A1 Jun. 28, 2012

Related U.S. Application Data

(63) Continuation of application No. 12/477,026, filed on Jun. 2, 2009, now abandoned.

(60) Provisional application No. 61/057,886, filed on Jun. 2, 2008.

(51) Int. Cl.

| | |
|---|---|
| ***B41J 15/00*** | (2006.01) |
| ***B41J 13/24*** | (2006.01) |
| ***B23Q 16/00*** | (2006.01) |
| ***B41F 1/34*** | (2006.01) |
| ***B65H 9/00*** | (2006.01) |

(52) U.S. Cl.
USPC ............... 400/619; 400/621; 101/485; 83/72; 83/74; 271/226

(58) Field of Classification Search
USPC .................... 400/619, 321; 83/13, 72, 74–75; 271/226, 236; 101/485; 428/32.1
See application file for complete search history.

(56) References Cited

U.S. PATENT DOCUMENTS

| | | | | |
|---|---|---|---|---|
| 7,054,708 | B1 * | 5/2006 | Aamodt et al. | 700/122 |
| 2005/0186010 | A1 * | 8/2005 | Shibata et al. | 400/621 |
| 2006/0087647 | A1 * | 4/2006 | Bagley et al. | 356/237.2 |
| 2006/0196381 | A1 * | 9/2006 | Mikkelsen et al. | 101/485 |
| 2006/0278111 | A1 | 12/2006 | Berdan | |

OTHER PUBLICATIONS

International Search Report relating to PCT/US2009/046010 dated Jul. 20, 2009.
Non-Final Office Action dated Aug. 5, 2011, issued by the USPTO relating to U.S. Appl. No. 12/477,026.
Final Office Action dated Jan. 4, 2012, issued by the USPTO relating to U.S. Appl. No. 12/477,026.

* cited by examiner

*Primary Examiner* — Michael G Lee
*Assistant Examiner* — Laura Gudorf
(74) *Attorney, Agent, or Firm* — Honigman Miller Schwartz and Cohn LLP

(57) ABSTRACT

A method including printing an image onto a medium and printing an alignment region onto the medium. The method further including loading the medium to an electronic cutter and aligning the medium with the electronic cutter. The method further including cutting the image from the medium.

8 Claims, 6 Drawing Sheets

SYSTEM AND METHOD FOR PRINTING AND CUTTING

CROSS REFERENCE TO RELATED APPLICATIONS

This application is a continuation application of U.S. patent application Ser. No. 12/477,026 filed on Jun. 2, 2009, now abandoned, claims priority under 35 U.S.C. 119(e) to U.S. Provisional Patent Application No. 61/057,886 filed on Jun. 2, 2008, titled "System and Method for Printing and Cutting", to Jonathan Aaron Johnson, the contents of which are incorporated in their entirety herein by reference.

FIELD OF THE INVENTION

The disclosure relates to a system and method for printing and cutting.

BACKGROUND

Typical personal cutting apparatuses are not configured for cutting over an arbitrary printed image, such as may be produced by an inkjet printer. Moreover, attempts to cut a printed image may lead to misalignment and frequent mistakes. Thus, a need exists for a simple and accurate method to align a personal cutting apparatus with a printed image.

BRIEF DESCRIPTION OF THE DRAWINGS

The disclosure will now be described, by way of example, with reference to the accompanying drawings, in which.

DETAILED DESCRIPTION OF THE INVENTION

The Figures illustrate an exemplary embodiment of printing and cutting in accordance with an embodiment of the invention. Based on the foregoing, it is to be generally understood that the nomenclature used herein is simply for convenience and the terms used to describe the invention should be given the broadest meaning by one of ordinary skill in the art. This application claims priority under 35 U.S.C. 119(e) to U.S. Provisional Patent Application No. 61/057,886 filed on Jun. 2, 2008, titled "System and Method for Printing and Cutting", to Jonathan Aaron Johnson, the contents of which are incorporated in their entirety herein by reference.

Figure 1:
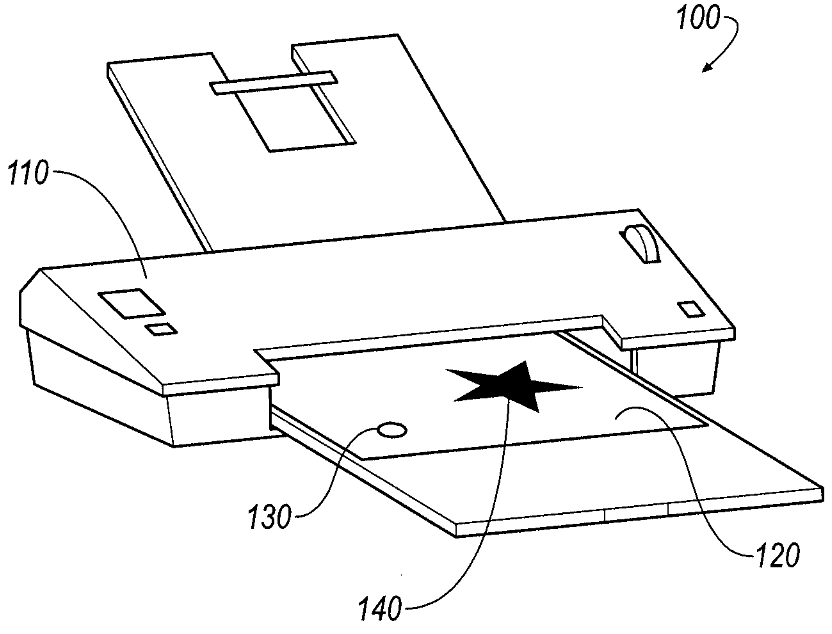
FIG. 1 is a printer used to print an image on a craft material.

FIG. 1 shows a first step where a user may print an image 140 to a craft material 120. The user may design or select the image using a personal computer and/or a software package suited for printing images. A printer 110 may be, for example, an inkjet printer, a laser printer, or any other type of printer. The craft material 120 may be any type of paper, sticker, sticker holder, or other material that may be desirable. The software package may include special features for printing and cutting of shapes in the craft material 120. In one example, a feature includes the automatic printing of an alignment region 130 on the craft material 120 so that the cutter 210 may be aligned with the image 140 in later steps. Using the software package or other printing software, the user may print images to their regular printer using a mat-less stock (described below). Such images, when cut may be considered "Sticut" image. Alternatively, the user may print images on regular paper or other materials that may be used with a sticky-mat-type cutting substrate that may include a sticky surface to hold the paper during the cutting operation. Note that alignment region 130 may be printed by the printer or it may be pre-printed on the craft material.

Figure 2:
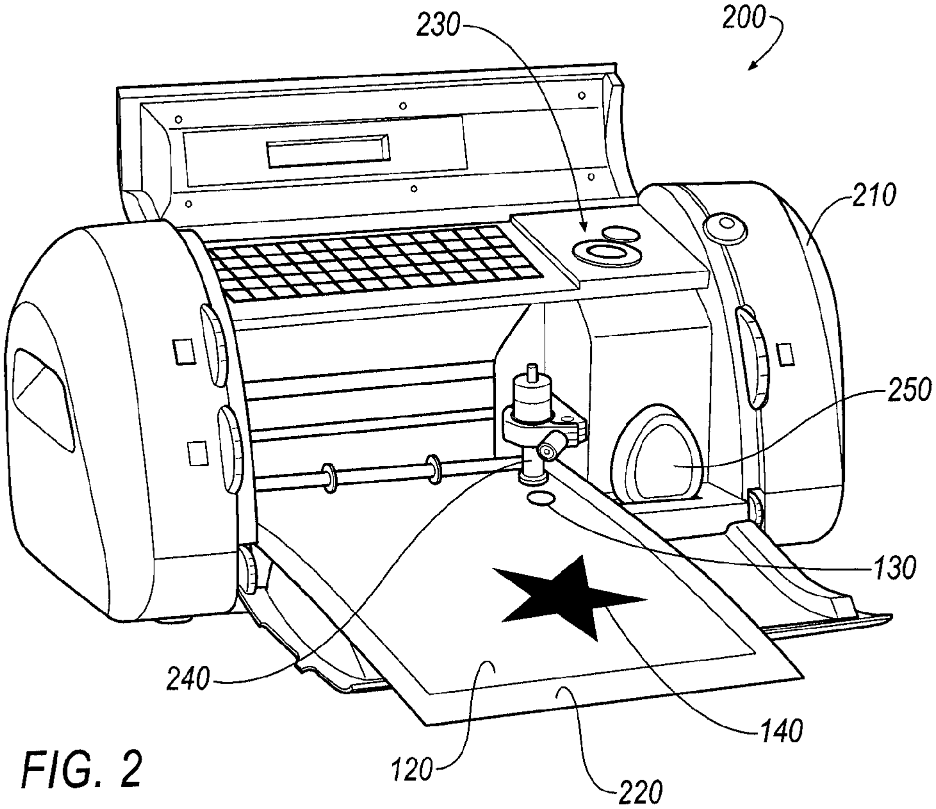
FIG. 2 is a personal electronic cutter with the craft material loaded and being aligned.

FIG. 2 shows a second step, the user takes printed result, inserts it into their personal electronic cutter 210 (e.g., Cricut® machine) and registers the blade position by pushing down the blade arm and aligning the blade housing 240 within the printed alignment region 130. An example of a Cricut® machine is described in detail in application Ser. No. 11/457,419, filed Jul. 13, 2006, to Robert Workman et al., the contents of which are incorporated herein by reference.

The alignment region 130 is shown in FIGS. 2-5 as a circle in the corner of the craft material 120. The alignment region 130 may be located in a non-used portion of the craft material to avoid printing image 140 over the alignment region 130. The size of alignment region 130 is such that the cutting head of the personal electronic cutter 210 may fit perfectly within the circle of alignment region 130 to properly align the paper, and the printed image 140, with the cutting machine. If there is a misalignment after loading the craft material 120 into the cutting machine 210, the user may use the "arrow-keys" 230 of the cutting machine to maneuver the cutting head to position over alignment region 130. Alternatively, as discussed below with respect to FIGS. 7 and 8, the personal electronic cutter 210 may automatically locate the alignment region 130 using an optical sensor.

Once alignment is achieved, the craft material 120 is in a known X-Y alignment with the electronic cutter 210. Then user may then cut around the periphery of the printed area. This may be accomplished, for example, by having the software package control the electronic cutter 210 directly since the software package knows the position of the alignment region 130 with respect to the printed image 140.

In another embodiment, the printed image 140 and the cutting may performed using the cartridge only. To ensure accurate registration, the print and cut functions are controlled by a print & cut software on a personal computer (PC) or by the personal electronic cutter itself, having specialized print & cut hardware. For example, the cartridge may include X-Y alignment offsets for the printed image 140 and the cutting path.

In use, the alignment region 130 may be printed in upper right corner of the craft media. After the user loads the craft media into the personal electronic cutter, the user imply pushes the blade housing 240 down to see if the housing and target are aligned. If they are not, the user then changes the location of the blade housing the arrow keys 230. Once alignment is complete, the user then indicates that alignment is complete, e.g. pushing the "cut" button on the personal electronic cutter.

Figure 3:
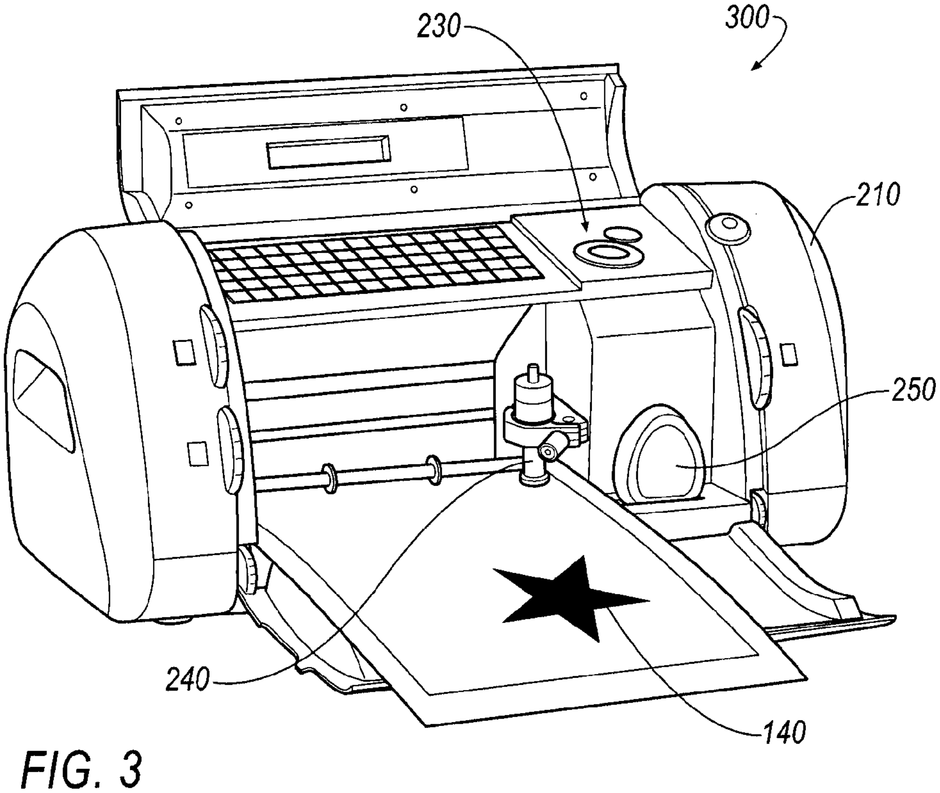
FIG. 3 is a personal electronic cutter used for cutting out the image.

FIG. 3 shows the software controlling the personal electronic cutter 210 to edge-cut the artwork 140. Alternatively, the cartridge 250 of the electronic cutter 210 may include the cutting location relative to the alignment region 130 and cut the image 140 at the periphery.

Figure 4:
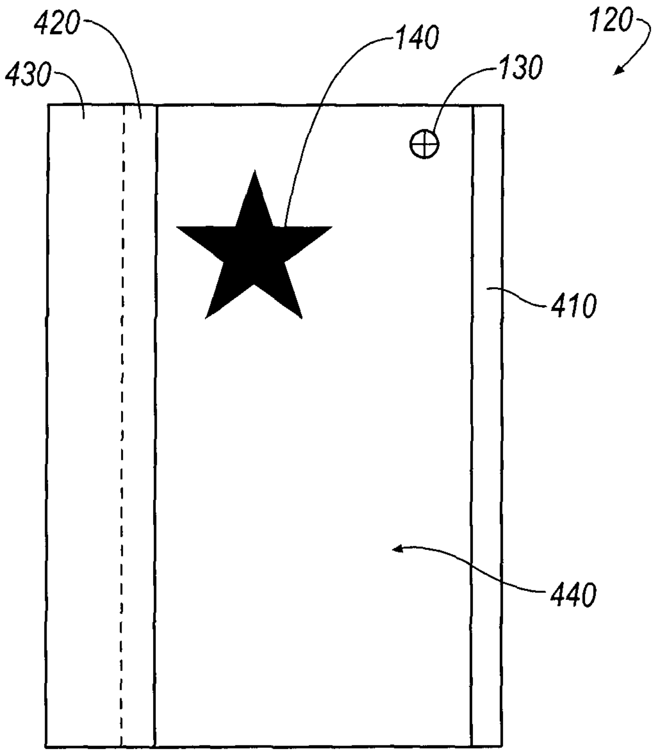
FIG. 4 is a top view of a configurable mat-less craft paper.
Figure 5:
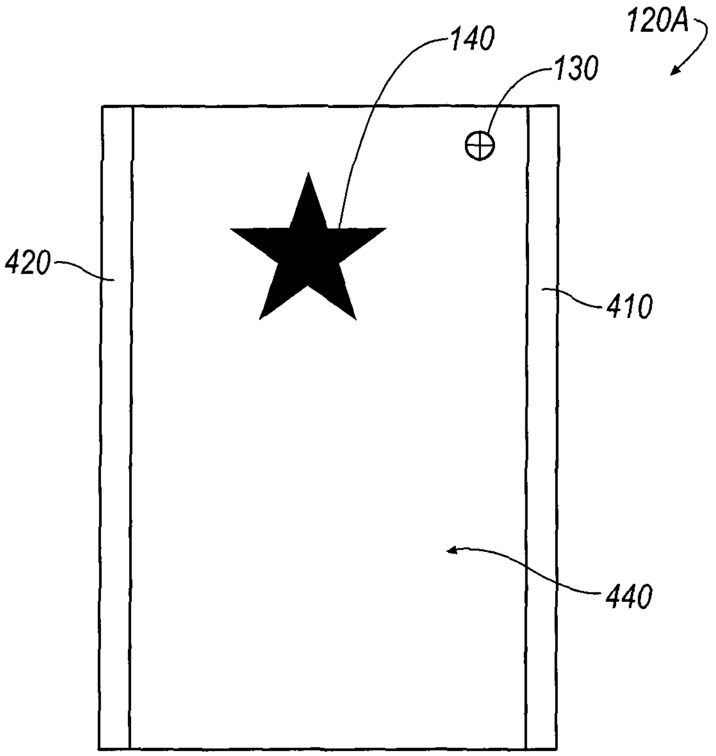
FIG. 5 is a view of a mat-less craft material.

FIG. 4 shows a mat-less stock, generally considered a cutting stock, that does not require a separate mat to be cut. The mat-less stock 120 may include regions 410, 420 at the outer periphery that provide a surface for the rollers of the cutting machine 210 to stick to and drive the stock. The inner section 440 provides a region for printing, then cutting. In one example, the outer regions are scored in relation to the main region providing a roller edge. In a small version, the mat-less stock includes a tear-away portion 430 that leaves a six (6) inch section, with roller edges 410, 420. The larger size of the mat-less stock 120 allows for use in standard printers and then when tear-away portion 430 is removed, the mat-less stock 120 may be used in cutting machine having a narrower opening. FIG. 5 shows a mat-less stock 120A that does not include a tear-away portion.

Figure 6:
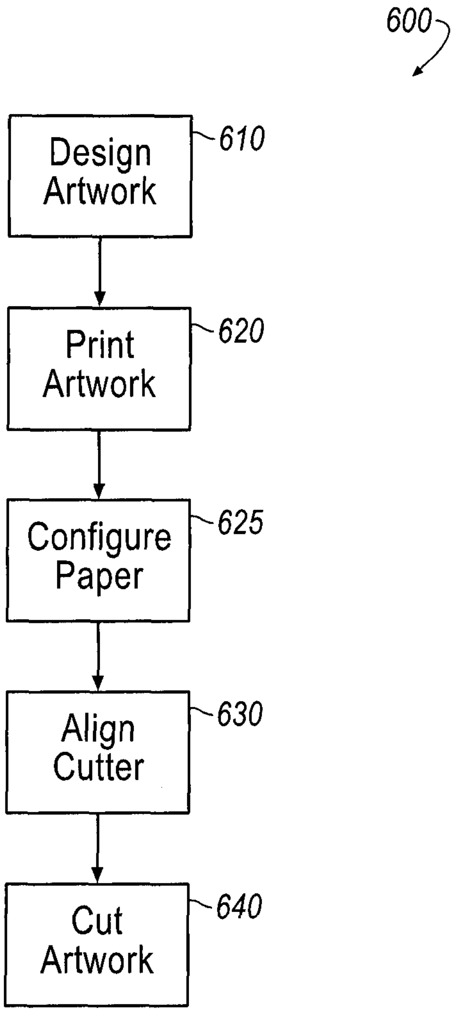
FIG. 6 is a method of printing and cutting.

FIG. 6 shows a method 600 for printing and cutting. The steps may include mat-less stock, or typical paper stock.

In step 610, the user may design or select the artwork to be printed then cut. The design may use a personal computer or other processing device to select artwork. The artwork may be single-color or include multiple colors. Moreover, the artwork may be selected from stored cartridge content, such as the cartridges provided with the Cricut® personal electronic cutter.

In step 620, the user may print the artwork on cutting stock. The printing step may also include printing alignment region 130, or alternatively, alignment region may be pre-printed on the cutting stock. The printing may be accomplished with an inkjet printer, laser printer etc.

In step 625, the user may configure the paper by removing the tear-away portion 430 (e.g., when using mat-less stock 120). If regular paper stock is used, the configuration step may be skipped. For example, where a sticky-mat-type system is used (e.g., with the Cricut® personal electronic cutter) then a tear-away portion may not be required or desired. The user may then load the craft material 120 into a personal electronic cutter 210.

In step 630, the user may align the blade housing 240 with alignment region 130. To test the alignment, the user may press downwardly on blade housing 240 until blade housing 240 touches, or nearly touches, alignment region 130. If blade housing 240 is perfectly, or nearly perfectly, within alignment region 130 then the alignment is complete. If blade housing 240 is not perfectly, or nearly perfectly, within alignment region 130 then the user may adjust the position of blade housing 240 and craft material 120 until they are. To adjust the positions, the user may use the "arrow-keys" 230 of the cutting machine (see FIG. 3) to maneuver the cutting head to position over alignment region 130. Alternatively, as discussed below with respect to FIGS. 7 and 8, the personal electronic cutter 210 may automatically locate the alignment region 130 using an optical sensor.

In step 640, the user may initiate cutting the artwork using the electronic cutter 120. The user may initiate this action by pressing the "Cut" button on the personal electronic cutter 210.

In providing printing and cutting functionality, the user may purchase printing images and cutting images, often purchased as a pair in a "sticut" scenario or having other content. The user may also purchase printers and inks specially made or formulated for making stickers using a printer and electronic cutting machine.

Figure 7:
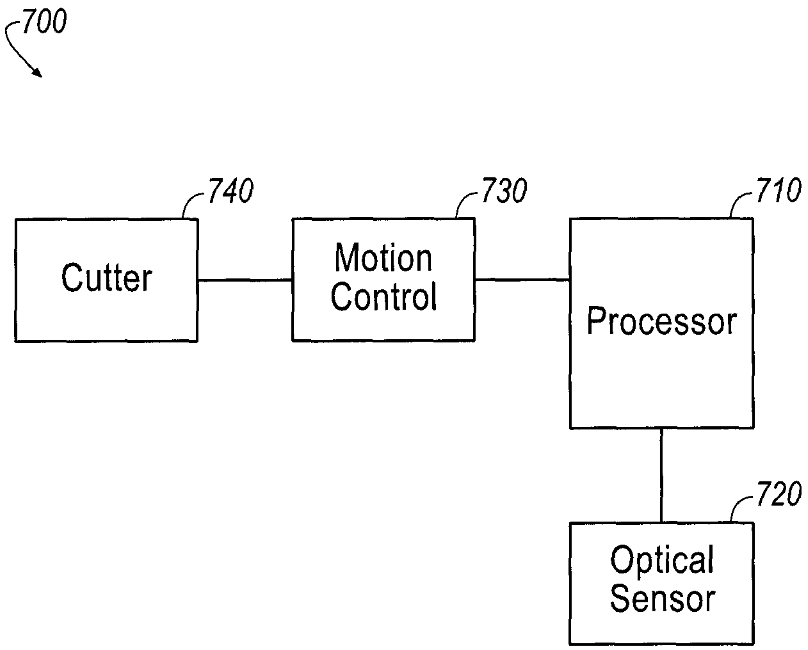
FIG. 7 is a system for the personal electronic cutter that includes an optical sensor for finding an alignment region.

FIG. 7 is a system 700 for the personal electronic cutter 210 that includes an optical sensor for finding alignment region 130. The personal electronic cutter 210 includes a processor 710 for controlling an optical sensor 720 and a motion control system 730 for cutter 740. Cutter 740 may include blade housing 240 (as shown above in FIGS. 2 and 3). The blade used for cutting the craft material 120 may be housed within blade housing 240. The motion control system 730 may include an X-Y-Z controller to move the craft material 120 in a Y direction, the blade housing 240 in an X direction, and the blade housing 240 (and blade) in a Z direction. In this way, processor 710 has control over the motion of the blade housing 240 and the craft material 120. \

In an example, the optical sensor 720 may be located near the bottom of blade housing 240. Thus, the system motion control 730 allows for movement of the optical sensor with the blade housing 240. Optical sensor 720 may include a light emitting device such as a light emitting diode (LED) and an optical detector. Optical sensor 720 may include a light emitting device operating in the infrared spectrum (IR) and an optical detector sensitive to the same spectrum. Optical sensor 720 may be designed to detect the edges of alignment region 130 or any pattern printed on craft material 120 to serve as a fiducial. For example, the system may be configured to always print alignment region 130 within a region of the craft material 120, and that the image 140 should not overlap that region. Given the strategy for printing alignment region 130, the personal electronic cutter 210 may use processor 710 and optical sensor 720 to locate alignment region 130. For example, personal electronic cutter 210 may use optical sensor 720 to determine the extents of alignment region 130 and then determine the center. The center of alignment region 130 may then become the alignment point and the offsets for cutting the image 140 are known for a precise cut.

Figure 8:
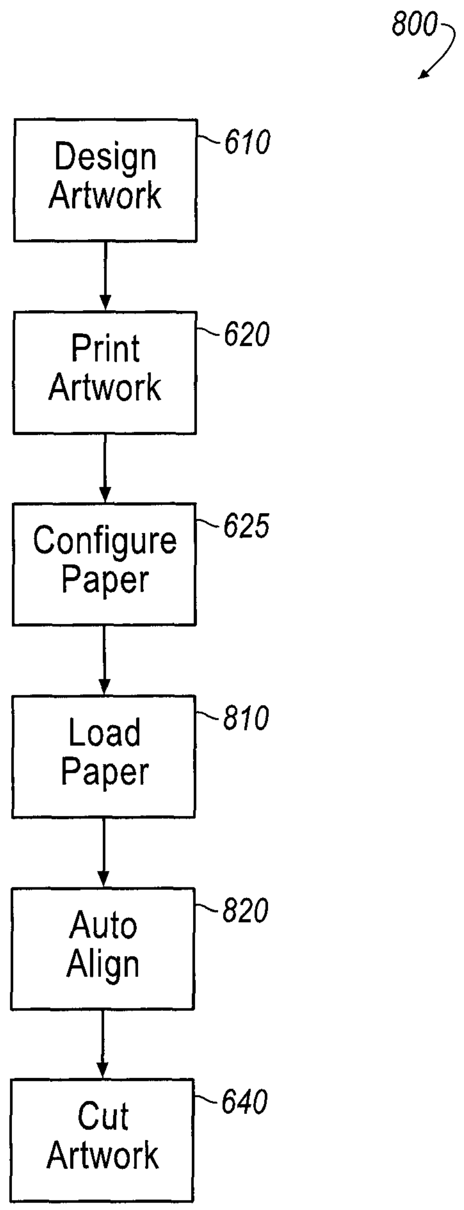
FIG. 8 is a method for printing and cutting having automatic alignment.

FIG. 8 is a method for printing and cutting having automatic alignment. In this example, the personal electronic cutter 210 automatically aligns the craft material 120 using an optical sensor.

In step 610, the user may design or select the artwork to be printed then cut. The design may use a personal computer or other processing device to select artwork. The artwork may be single-color or include multiple colors. Moreover, the artwork may be selected from stored cartridge content, such as the cartridges provided with the Cricut® personal electronic cutter.

In step 620, the user may print the artwork on cutting stock. The printing step may also include printing alignment region 130, or alternatively, alignment region may be pre-printed on the cutting stock. The printing may be accomplished with an inkjet printer, laser printer etc.

In step 625, the user may configure the paper by removing the tear-away portion 430 (e.g., when using mat-less stock 120). If regular paper stock is used, the configuration step may be skipped. For example, where a sticky-mat-type system is used (e.g., with the Cricut® personal electronic cutter) then a tear-away portion may not be required or desired.

In step 810, the user may load the craft material 120 into a personal electronic cutter 210. When using automatic alignment of the craft material 120 with the personal electronic cutter 210, the user may be required to place the craft material 120 into the personal electronic cutter 210 at a defined location. This may assist the personal electronic cutter to locate the alignment region 130. However, such an orientation requirement may not be necessary because the electronic cutter may check opposite corners, or each corner, of the craft material 120 if the alignment region 130 is not found.

In step 820, the personal electronic cutter may attempt to locate the alignment region 130. The personal electronic cutter may use processor 710 and optical sensor 720 (see FIG. 7) to move craft material 120 and blade housing 240 to locate alignment region 130. In an example, the optical sensor 720 may be located near the bottom of blade housing 240. Processor 710 may use motion control system 730 to move both the blade housing 240 and craft material 120 to a starting position at an expected location for alignment region 130. Processor 710 may then move blade housing 240 and craft material 120 to determine where a boundary for alignment region 130 is. The system may use the optical sensor 720 to emit light, and then use the optical detector to detect the reflection, or substantial lack of reflection, from craft material 120. In this way, a non-printed region of craft material 120 may reflect a significant amount of the light back to the optical detector whereas a printed region may not reflect as much light back to the optical detector.

In an example, the pattern of alignment region 130 is known to the personal electronic cutter 210. When the optical sensor 720 is move over the region expected to contain alignment region 130, if the appropriate pattern is detected then the personal electronic cutter 210 may deem the alignment region as found. For example, when alignment region 130 is configured as a circle, the personal electronic cutter 210 may know the size and line thickness of the pattern for comparison. If the appropriately sized circle is found for alignment region 130 (e.g., as shown in FIG. 1) then the personal electronic cutter will determine the center of the circle as the initial starting point and/or offset for cutting.

In another example, the alignment region 130 is configured as a circle with cross-lines therethrough (see FIGS. 4 and 5), the personal electronic cutter 210 may know the size and line thickness of the pattern for comparison. If the appropriately sized circle is found and the cross-lines are found for alignment region 130 then the personal electronic cutter will determine the center of the circle and may verify the calculation by using the position of intersection for the cross-lines. This location may then be used as the initial starting point and/or offset for cutting.

In step 640, the personal electronic cutter may initiate cutting automatically after locating the alignment region 130. Alternatively, the user may initiate cutting the artwork using the electronic cutter 120. The user may initiate this action by pressing the "Cut" button on the personal electronic cutter 210.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method, comprising:

preparing a paper medium that includes an image-receiving region, a first sticky outer periphery region extending along a length of the paper medium, and a second sticky outer periphery region extending along a length of the paper medium, wherein the image-receiving region is located between the first sticky outer periphery region and the second sticky outer periphery region;

loading the paper medium into an electronic cutter such that: a first roller of the electronic cutter directly contacts the first sticky outer periphery region, and, a second roller of the electronic cutter directly contacts the second sticky outer periphery region for driving the paper medium relative to the electronic cutter in a forward direction or a reverse direction;

after the loading step, utilizing one or more components of the electronic cutter for determining misalignment of the paper medium relative to a blade of the electronic cutter;

after the determining step, further utilizing the one or more components of the electronic cutter for:

A) moving the blade to a cutting position relative to the paper medium that compensates for misalignment of the paper medium relative to the blade, and then B) arranging the blade in direct contact with the paper medium, and then C) moving the blade relative to the paper medium in direction orthogonal to either of the forward direction and the reverse direction for cutting a pattern into the paper medium.

2. The method according to claim 1, wherein the utilizing one or more components of the electronic cutter for determining misalignment of the paper medium relative to a blade of the electronic cutter is conducted by:

1a) detecting an X-and-Y position of an alignment fiducial arranged upon the image-receiving region of the paper medium, and then 1b) moving the blade from a default X-and-Y position that is not aligned with the X-and-Y position of the alignment fiducial to an aligned position with that of the X-and-Y position of the alignment fiducial such that the electronic cutter compensates for a misalignment condition of the paper medium during the cutting step; and 2) if the X-and-Y position of the alignment fiducial is not detected during the detecting step, detecting at least two corners of the paper medium such that the electronic cutter compensates for the misalignment condition of the paper medium during the cutting step.

3. The method according to claim 2, wherein the paper medium includes four edges such that the at least two corners include four corners, wherein the detecting step includes:

detecting opposite corners of the four corners.

4. The method according to claim 2, wherein the paper medium includes four edges such that the at least two corners include four corners, wherein the detecting step includes:

detecting each corner of the four corners.

5. The method according to claim 2, wherein the one or more components of the electronic cutter includes a blade housing, wherein the blade hosing includes the blade and an alignment fiducial sensor, wherein the one or more components of the electronic cutter further includes a processor and a blade housing motion controller, wherein the alignment fiducial sensor is in communication with the processor, wherein the processor is in communication with the blade housing motion controller, wherein upon the alignment fiducial sensor conducting the step of detecting the X-and-Y position of the alignment fiducial upon the image-receiving region of the paper medium, the alignment fiducial sensor further conducts the step of communicating the X-and-Y position of the alignment fiducial upon the image-receiving region of the paper medium to the processor such that the processor conducts the step of communicating an X-and-Y movement signal to the blade housing motion controller for executing the moving the blade from the default X-and-Y position that is not aligned with the X-and-Y position of the alignment fiducial to the aligned position with that of the X-and-Y position of the alignment fiducial.

6. The method according to claim 1, wherein the utilizing one or more components of the electronic cutter for determining misalignment of the paper medium relative to a blade of the electronic cutter is conducted by:

manually operating a user interface of the one or more components of the electronic cutter for manually providing one or more: X-position input signal(s) and Y-position input signal(s) to a processor of the one or more components of the electronic cutter, wherein the processor is in communication with a blade motion controller of the one or more components of the electronic cutter that is connected to the blade such that manual entry of the one or more X-position and Y-position signal(s) results in manual control of the blade motion controller for manually moving the blade from a default X-and-Y position that is not aligned with an X-and-Y position of an alignment fiducial arranged upon the image-receiving region of the paper medium to an aligned position with that of the X-and-Y position of the alignment fiducial such that the electronic cutter compensates for a misalignment condition of the paper medium during the cutting step.

7. The method according to claim 1, wherein prior to the loading step, further comprising the step of:

utilizing a printer for printing the alignment fiducial upon the image-receiving region of the paper medium.

8. The method according to claim 1, wherein prior to the loading step, further comprising the step of:

utilizing a printer for printing an image upon the image-receiving region of the paper medium, wherein the cutting the pattern into the paper medium step includes the step of:

determining an edge of the image, and utilizing the edge as a guide for cutting the pattern.

* * * * *